United States Patent [19]

Cucchi et al.

[11] 4,292,864
[45] Oct. 6, 1981

[54] AUTOMATIC MAGAZINE AND FEEDER FOR AUTOMATIC MULTI-MANDREL LATHE

[76] Inventors: Pietro Cucchi; Giovanni Cucchi, both of Bussero, Italy

[21] Appl. No.: 81,445

[22] Filed: Oct. 3, 1979

[30] Foreign Application Priority Data

| Oct. 5, 1978 [IT] | Italy | 28441 A/78 |
| Mar. 16, 1979 [IT] | Italy | 21041 A/79 |
| Sep. 12, 1979 [IT] | Italy | 25656 A/79 |

[51] Int. Cl.³ ............... B23B 13/00; B23B 25/00
[52] U.S. Cl. ................................. 82/2.7; 82/38 A
[58] Field of Search ................ 82/2.7, 38 R, 38 A

[56] References Cited

U.S. PATENT DOCUMENTS

| 3,874,519 | 4/1975 | Mikami et al. | 82/2.7 |
| 3,941,256 | 3/1976 | Doe et al. | 82/2.7 |
| 3,955,687 | 5/1976 | Flisch | 82/2.7 |
| 4,006,654 | 2/1977 | Scheler | 82/38 A |
| 4,049,173 | 9/1977 | Gomez | 82/38 A |
| 4,088,230 | 5/1978 | Doe et al. | 82/2.7 |

FOREIGN PATENT DOCUMENTS 2298254  8/1976  France ........................ 82/38 A

*Primary Examiner*—Harrison L. Hinson
*Attorney, Agent, or Firm*—Haseltine and Lake

[57] ABSTRACT

An automatic feeder for multi-mandrel lathe is disclosed. The feeder comprises as many channels as the mandrels, each of which controlled for opening and closing by lever systems, and provided with bar pusher.

5 Claims, 15 Drawing Figures

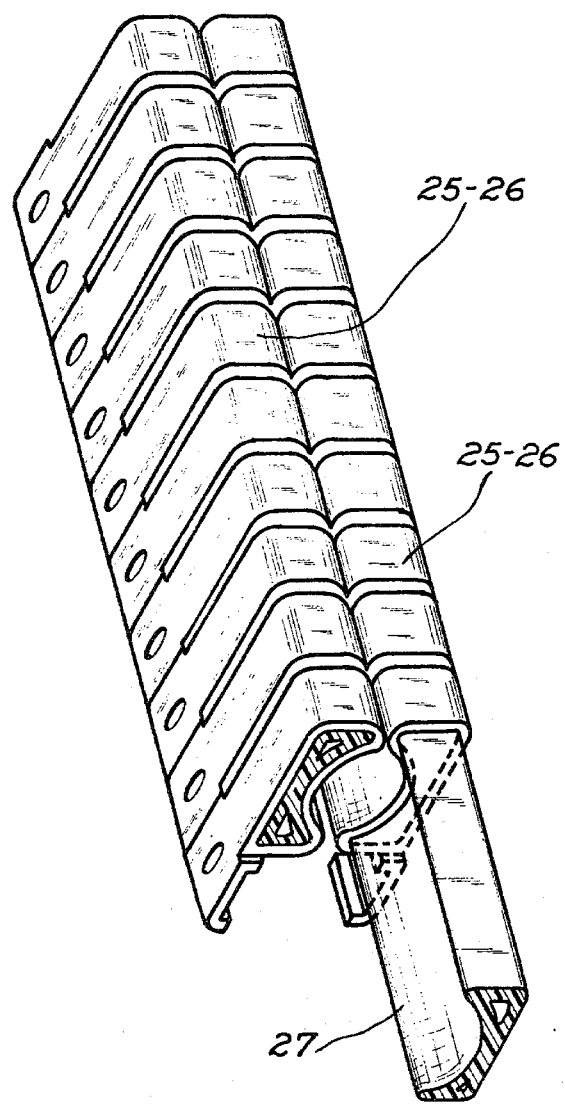

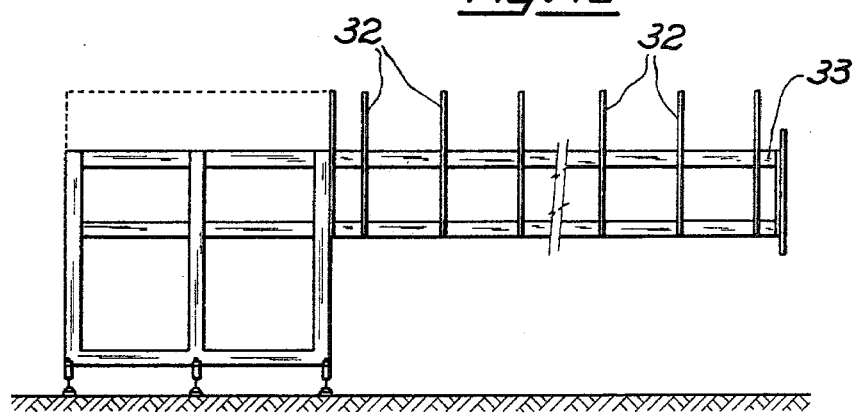
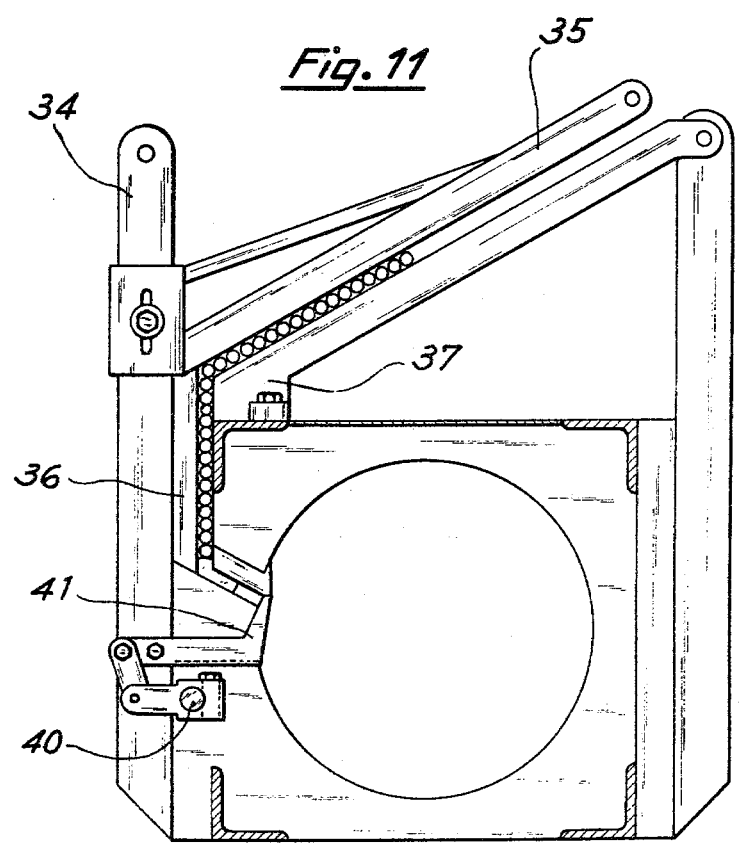

AUTOMATIC MAGAZINE AND FEEDER FOR AUTOMATIC MULTI-MANDREL LATHE

The present invention aims to provide a device for continuous automatic feeding in multi-mandrel lathes, wherein in addition to the feeder also an orderly automatic loading magazine is contemplated.

It is well known that for maintaining a high output in an automatic multi-mandrel lathe, the latter must be opportunely and correctly fed. Moreover, due to the high precision of its mechanisms, such a lathe should not be burdened with anomalous mechanical stresses, such as those caused by bar oscillations and flapping.

It is also desirable that the feeders be versatile, that is capable of readily accommodating bars of different material (such as steel or brass) of a quite variable section as to shapes or size (square, round or exagonal bars). The commercially available machines either require a considerable operation by the man operator, or are noisy and also scarcely reliable as to feed continuity.

Through a simple method the present invention achieves the following advantages:

(1) bars are intermittently loaded, since a reasonable magazine is built up of bars in orderly array ready to move down in the feed channels;

(2) the feed channels, in a same number as the heads, have a vibration-damping and antiwear system which does not fatigue the machine, impair the material and disturb the ambient with too high noises;

(3) each of the channels carry a feed device or bar pusher, as widely tested in single-channel feeders;

(4) the bar feed through the bar pusher and its fast no-load return are synchronously provided owing to gear wheels successively meshing, as controlled by the lathe motor, and not by other independent motors which might operate untimely.

During the return stage, the bar pusher extracts or draws the length from the mandrel collet and moves it to end of stroke, where it is drawn or extracted by the bar pusher and unloaded; in case of length absence, the machine would immediately stop.

The invention is described in the two basic steps, starting from the operating machine conditioning the requirement.

A lathe requires that the associated bar reaches the axis of each mandrel in quite aligned relationship. Accordingly, it is essential that such a bar is supported even for a distance of some meters and moves forward at a rate as determined by the type of processing.

IN THE DRAWINGS

The embodiment of this step and other features of the invention are described by way of unrestrictive illustrations in the accompanying drawings:

FIG. 9 illustrates a perspective view of an assembled channel assembly;

FIG. 10 is an illustration of a feeder magazine unit;

FIG. 11 is a front view of a lever;

Figure 14:
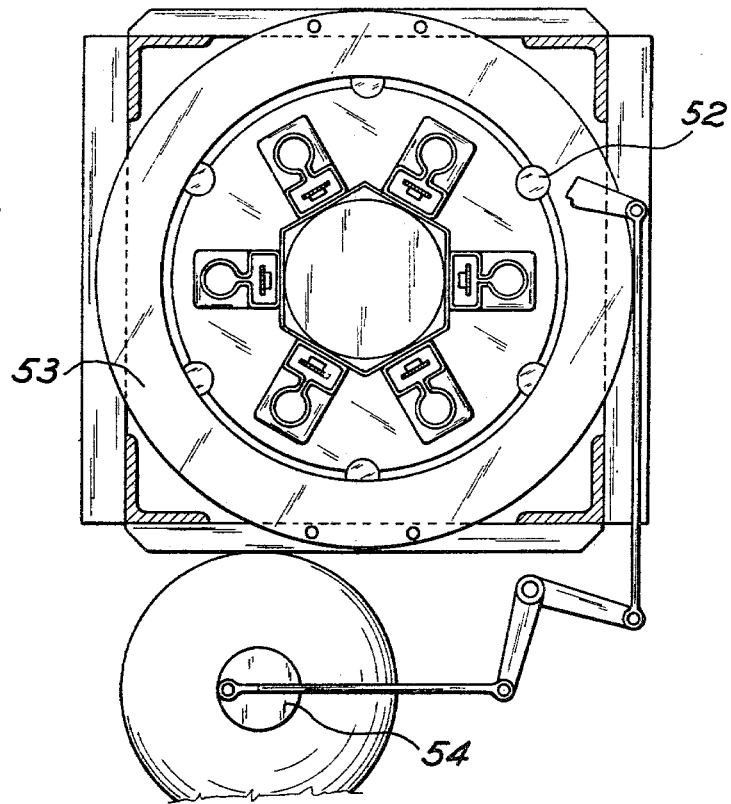

FIG. 14 schematically illustrates a control for channel opening and

Figure 15:
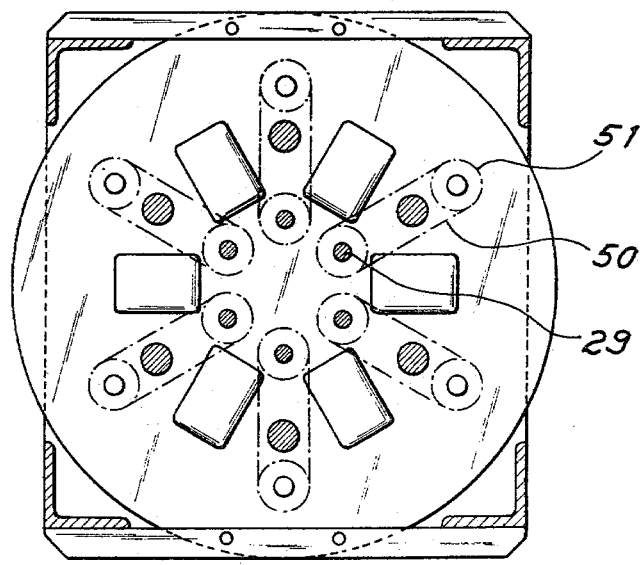

FIG. 15 schematically illustrates the crank mechanism of FIG. 14 for control operation by a chain.

A brief description of the operation will now be given.

A feeder according to the present invention is orderly supplied with bars from a magazine 1 (herein symbolically shown and the details of which will form integrating part of the patent and will be explained below), the magazine introducing one bar at a time.

The bar carrying channels 3, the structure of which will be further described in the following, comprises two parts or sections: namely, a section 4 which can be opened by articulated arms, so as to provide for bar admission, and which can be then immediately closed. The bar pushers are located in each of the channels and operated by a chain 6 driven by two pinions 5. As soon as a bar drops in the channel, the bar pusher will guide it to the lathe mandrel to start the processing which will continue at the rate as governed by the lathe.

The feed of bar pusher 5 is assured by a bevel gear pair 7 driven by a pair of cylindrical gears coaxial and integral with a pinion 9 connected by clutch and chain assembly to a particular motor, preferably an air motor, under the control of the lathe.

The very fast return movement of the bar pusher is effected before the arrival of the fresh bar through a second bevel gear pair 10 driven by an integral pair of gears 11 driven by a pinion 12 and connected via a clutch to a motor rotating in reverse direction. This is true for each pair of channels.

The above described mechanisms are integral with an arm 13 fixed to the frame, so that as the bar carrying channels rotate, all of the bar pushers 6 are alternately engaged through the planet wheels 8 and 11.

Due to the length of the bars, more than one support or bearing are required, and accordingly said bar carrying channels 3 are secured on three or more discs 14 bearing on as many supports 15 through rollers 16 enabling the whole assembly to rotate abouts its own axis, maintaining the center lines of all the channels and bar holders always aligned with the center lines of the associated lathe mandrels.

At its rear portion, the magazine is carried by a base 17, in which the driving part (motor, clutches, friction, etc.) is housed, and at the end front portion by an end support 18 which is coupled in the carrying seat as preset in the lathe structure. Thus, a free space is available as required in some types of lathe.

Finally, the bar carrying channels 3 project from the front portion of the support to connect to the lathe mandrels.

Now a disclosure is given how a bar carrying channel should be embodied, so that a bar is given a good forward movement and without causing any drawback.

As commonly available in commerce, the bar carrying channels are formed from regular steel sections, so that they are quite rigid, wearing and noisy, to impair not only the operator, but also the lathe heads, and particularly the microswitches.

In the present invention the bar carrying channels provided by webs of harmonic steel or molded nylon are in any case provided with rubber sections and achieve the following advantages:

(a) a noise reduced to 80% also in the presence of harmonic steel;
(b) the absorbing resilient structures are capable of dampening particularly also the noises generated during the processing of the square bar;
(c) owing to the absorption of the rubber of the drawn elastomer, the absorption of vibration and anulling of the resonance waves allow a high speed processing;
(d) the uninterrupted modular supports do not allow a cascade transmission of the noises generated in the individual sections;
(e) the channels, either of harmonic steel or nylon, are mechanically interchangeable and can be mounted depending on the type of the processing and material as well as the size of the bar to be processed;
(f) a long life, particularly in the harmonic steel type;
(g) preservation of the integrity of the corners both in hexagonal and square bars, particularly in the charged nylon type.

Figure 6:
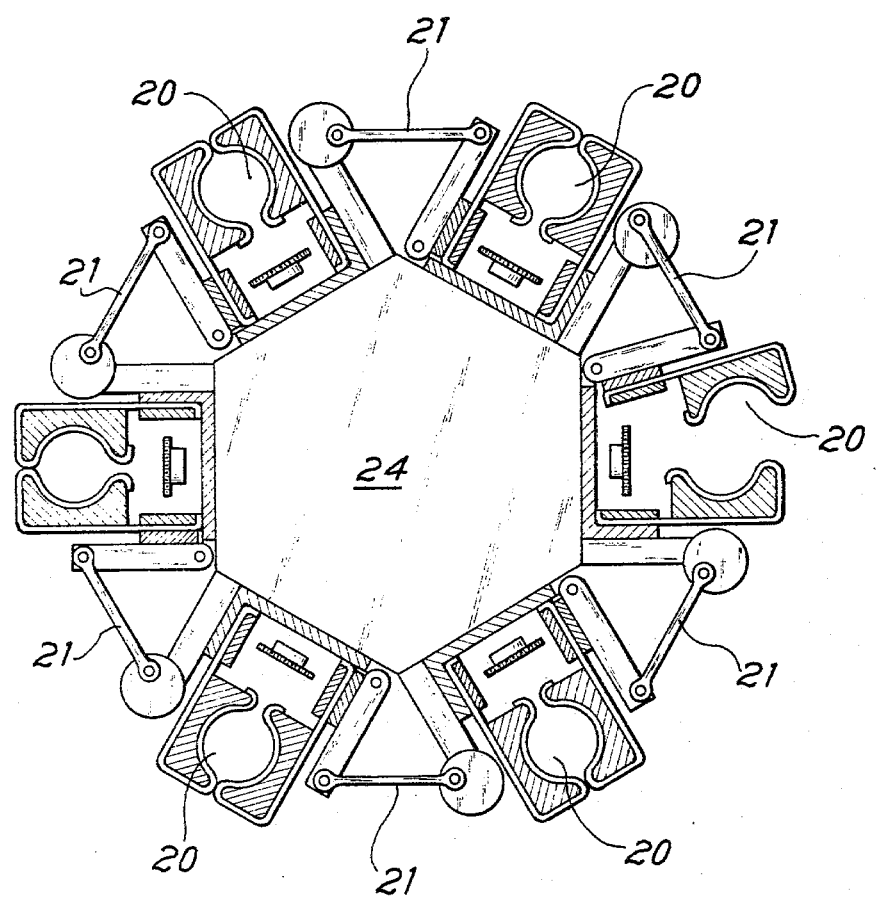
FIG. 6 is a cross-sectional view of a six channel type of feeder.
Figure 7:
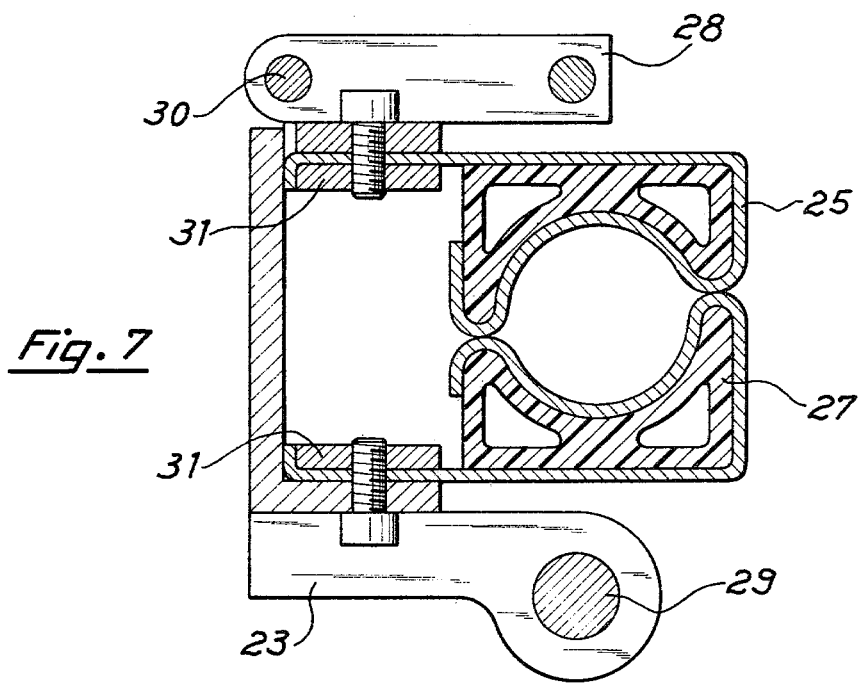
FIG. 7 is a cross-sectional view of a channel made of harmonic steel.
Figure 8:
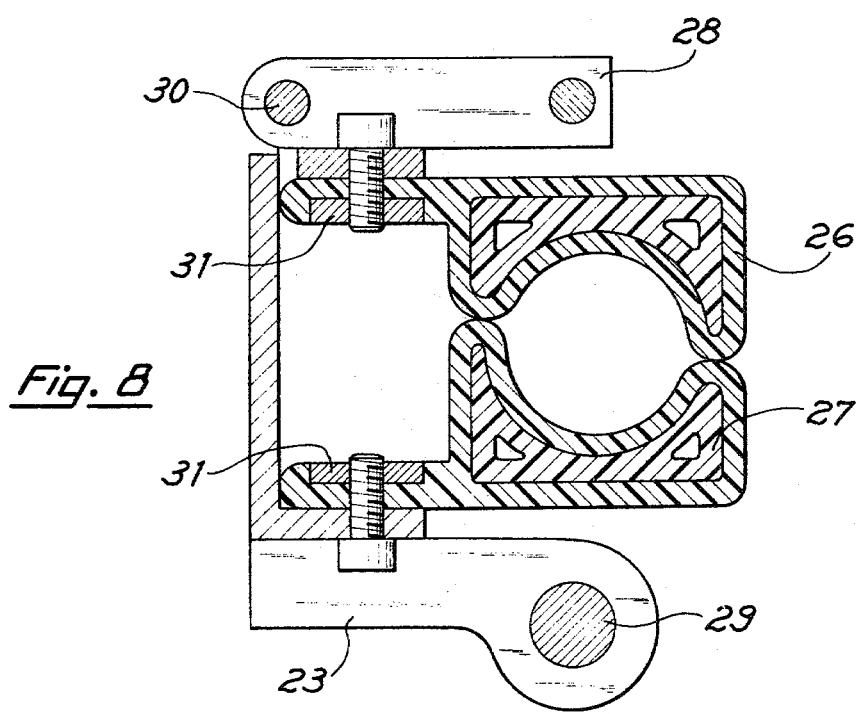
FIG. 8 is similar to FIG. 7 but made of charged nylon.

The invention will be described by way of unrestrictive example and for a better understanding with the aid of the accompanying sheets 4, 5 and 6. Such sheets show, respectively wherein:

a cross-sectional view of a six-channel type of feeder is shown in (FIG. 6);
a cross-sectional view of a channel made of harmonic steel is shown in FIG. 7 and one of charged nylon is shown in FIG. 8; and
a perspective view of an assembled channel assembly is shown in FIG. 9.

The bar carrying channels 20, herein in number of six, are radially arranged at constant angular intervals relative to the supply axis and with the axes of the individual channels coaxial with the individual mandrels. The channels comprise:

(a) a modular support portion of harmonic steel 25 or charged nylon 26 mounted in modular pairs with the tangent of the closure edges alternately rightwards and leftwards inclined relative to the center plane, the two modules and pairs thereof being mechanically and functionally interchangeable to one another, thus presenting a perfectly cylindrical continuity throughout the length of the channel, since the bar corners are prevented from entering the voids;
(b) a desounding dampening portion comprising two continuous bars 27 of drawn elastomer; and
(c) control members (FIG. 9) comprising a connecting rod and crank assembly 21 for channel opening to the bar introduction, the crank mechanism being operated by a shaft 29 supported by the fixed portion of the front channel 23, while the rod drives the moveable portion of channel 28 rotating on a hinge 30 integral with the fixed portion.

Said shaft 29 is actuated by a chain 50 shown in FIG. 15, which chain is driven by an outermost pinion 51 which is keyed on a rotable pin 52 of FIG. 14 which is allowed to rotate only at one precise position, as in that position the fixed outer brass ring 53 is undercut for the corresponding half-round, whereas it is retained against rotation at all of the other positions, because of not being undercut, thus assuring a perfect closure for the bar carrying channels.

Pin 52 is operated by an electric motor and a lever system 54 with an eccentrical disc.

The bar carrying channels are secured on a polygon (in this case a hexagon) 24 assuring the consistency for the center distances of the machine and feeder. In said FIG. 9 the carrying portion or section 25 and 26 is shown as comprising closely spaced modular elements stiffened by the elastomer drawn piece 27 and an anchoring plate 31 having fastening holes of modular pitch. The amount of modules and accordingly the length of the channel correspond to the lathe requirements.

Figure 1:
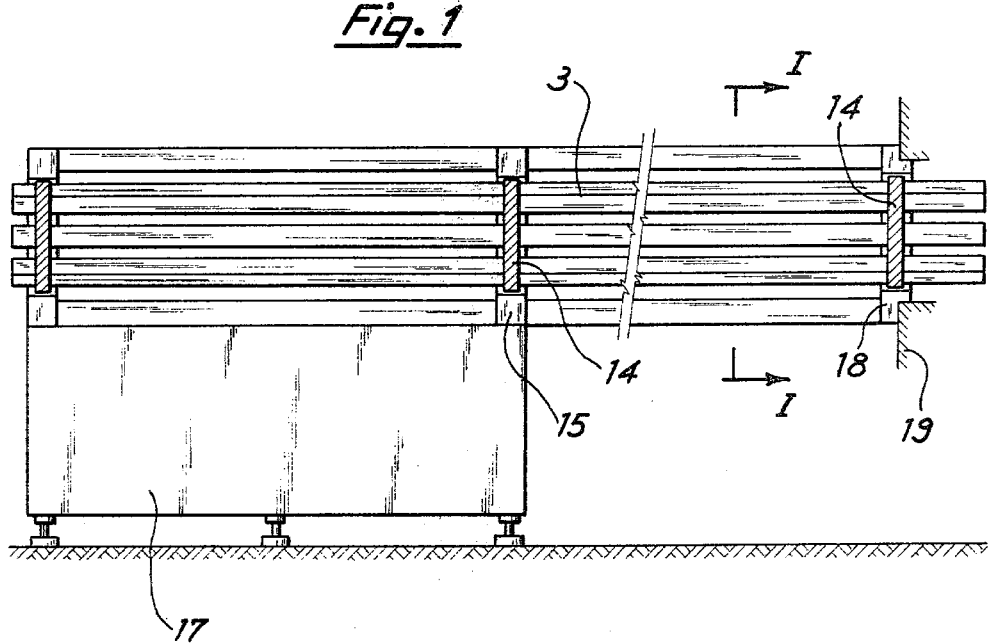
FIG. 1 is a fragmentary longitudinal section.
Figure 2:
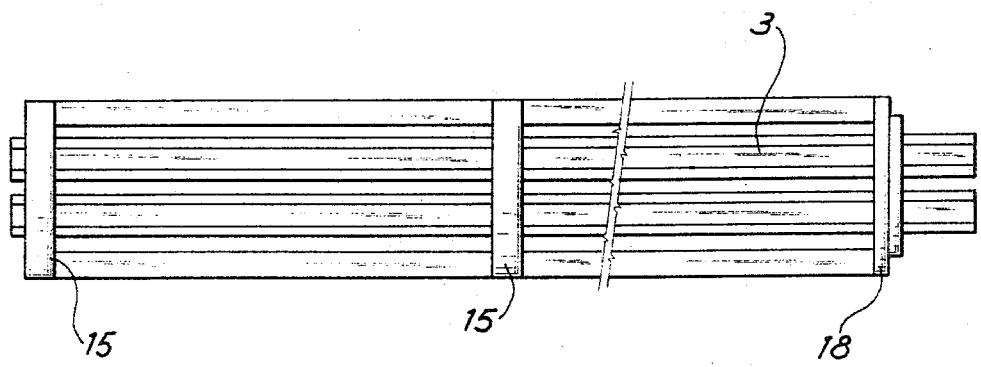
FIG. 2 is a plan view of the feed unit.
Figure 3:
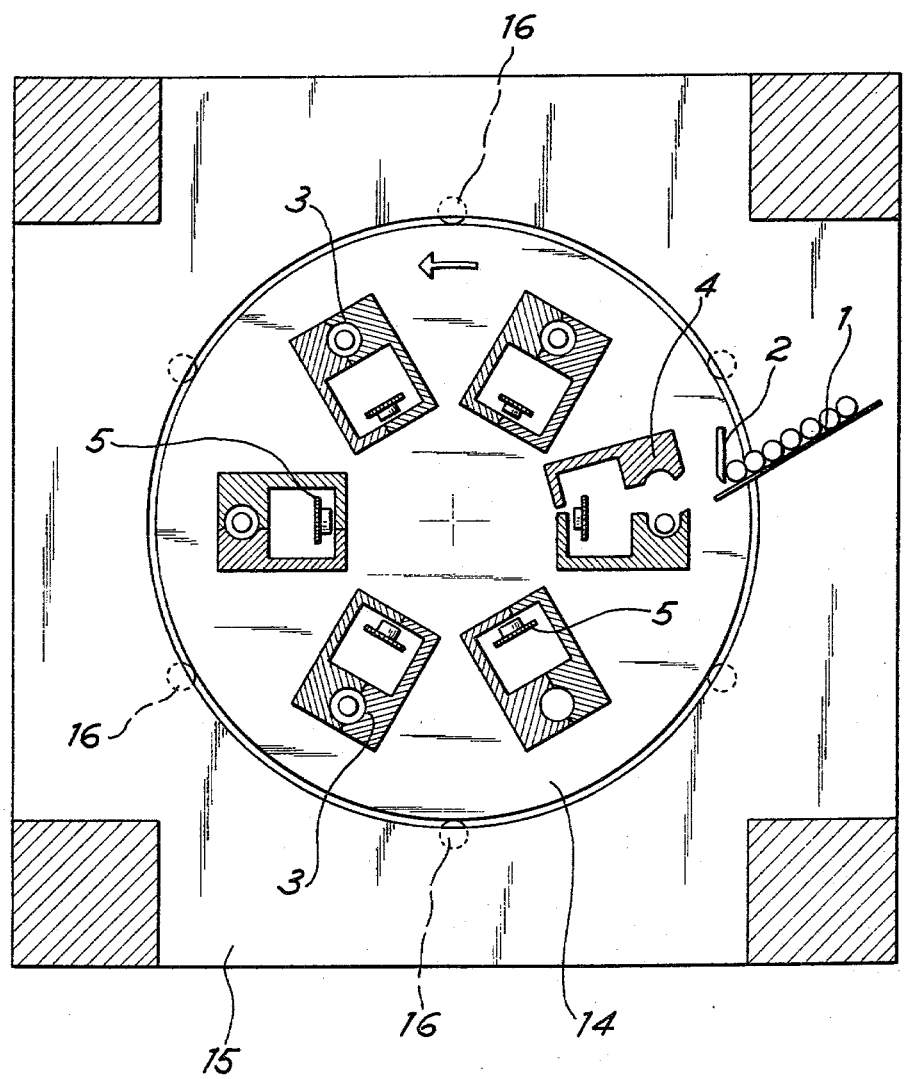
FIG. 3 is a diagrammatic sectional view taken along line I—I of FIG. 1.
Figure 4:
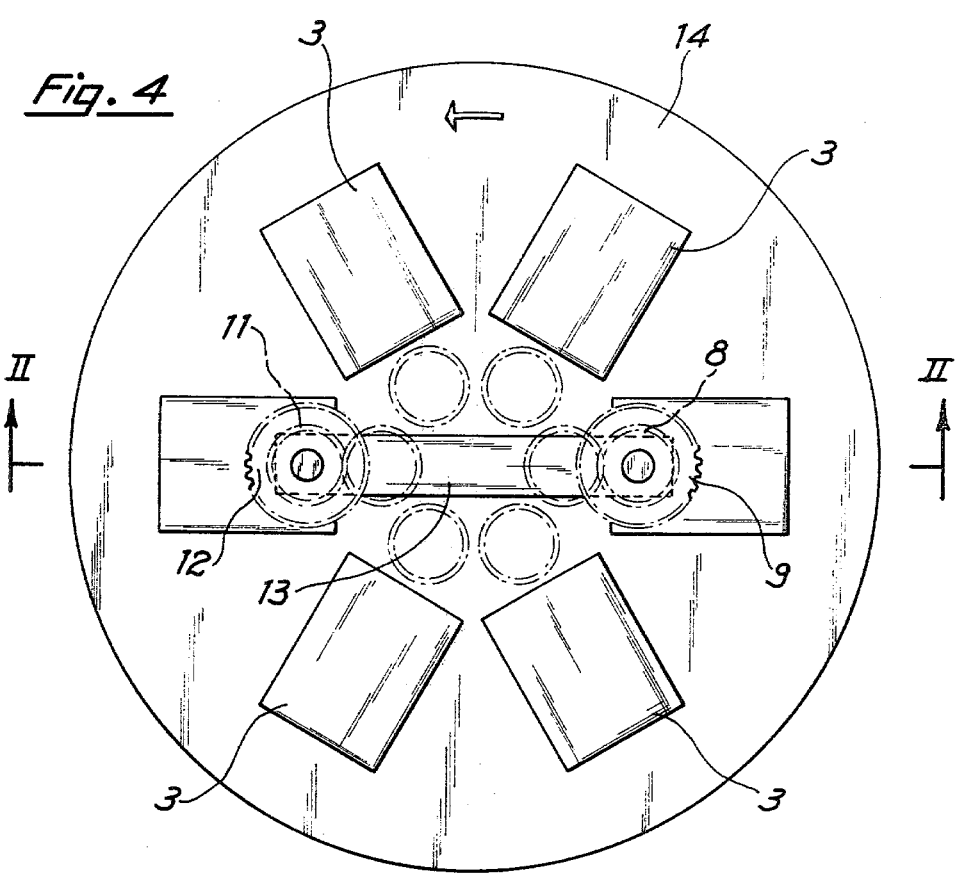
FIG. 4 is a front view of the drive mechanism for the bar pusher
Figure 5:
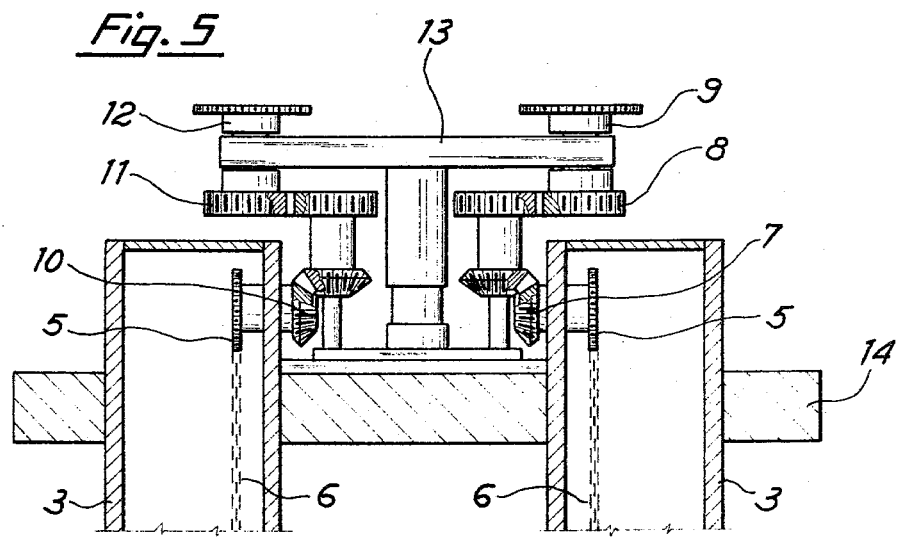
FIG. 5 is a simplified sectional view taken along line II—II of FIG. 4.

Now, it should be taken into account that the orderly entry of the bars into the feeding channels requires that such bars are presented at the mouth or inlet free of impact, orderly and parallel with the axis of the channels. To this end, the magazine 1 in FIG. 3 of sheet 2 may be organized with few pieces by a frequently intervening operator.

However, the present invention provides a more convenient mechanism due to the automatic magazine, avoiding the necessity of the operator's intervention at short times, and opportunely carrying the orderly bars to the mouth or inlet of the multi-feeder.

This is a unique magazine having long adjustable levers depending on the size of the bars to be loaded, allowing the latter to fall down in the channels without noisy fallings and wear of the channel walls and corners of the polygonal bars.

By way of unrestrictive illustration, the embodiment is now described of a magazine to be mounted side-by-side to the above shown feeder, of which it is the magazine to be supplied at large intervals of time. The magazine comprises an assembly of adjustable angular levers and applied to the feeder side.

For the sake of further clarity, FIGS. 10, 11, 12 and 13 of sheets 7 and 8, are shown by way of unrestrictive example.

Figure 12:
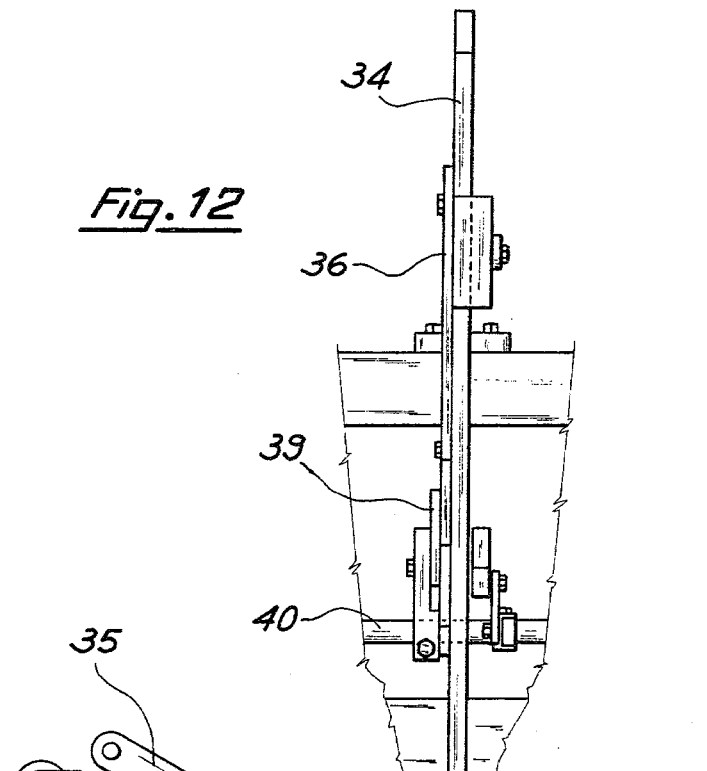
FIG. 12 is a side view illustration of FIG. 11.
Figure 13:
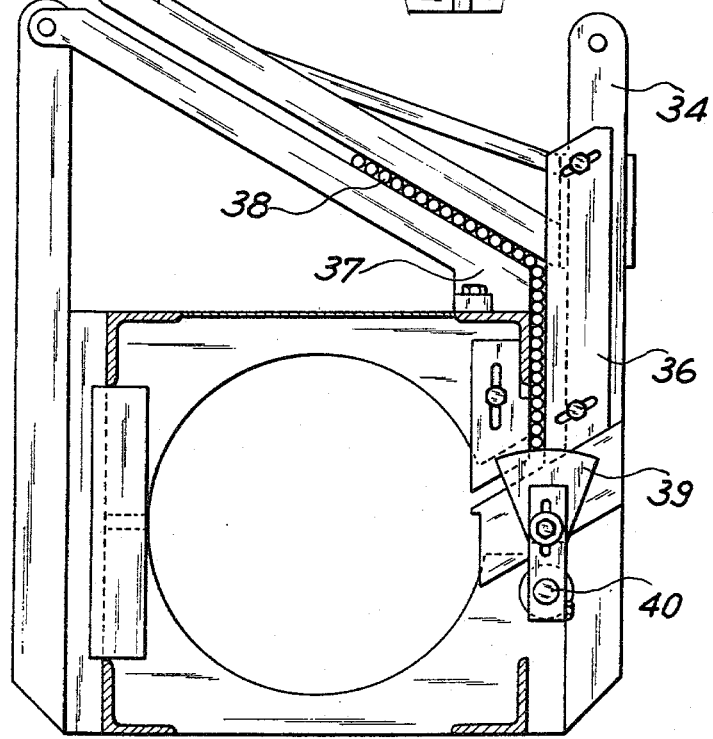
FIG. 13 is an opposite front view thereof.

In FIG. 12 one of the levers 1 is shown in a side view thereof, wherein reference numeral 34 denotes the supporting and adjusting rod for the moveable guides 35 and 36 which, by moving to and away from the fixed slide 37, define a variable cavity, calibrated according to size approximately the same as the minor size of the bars, the fixed guide 37 being arranged for a first length at a slightly larger angle than that of friction, vertical for a second length, and for a third length again at an angle close to that of friction. The bars 38 can orderly be arranged within such a calibrated cavity, the bars falling down and stowing on a rocking sector 39 arranged on one side of the supporting rod and controlled by a shaft 40 interconnecting and controlling all of said levers 32. Said shaft 40 causes the adjustable rocking sector 39 to open until a bar can pass therethrough upon reception of optical and electrical signals transmitting the order indicating the exhaustion of the bars in the channels to be supplied. The cleared bar slides on an inclined guide to the feeder mouth or inlet and is braked by a pawl 41 located on the opposite side of the support and controlled by said shaft 40, which annuls the kinetic fall energy and, by slowly turning, moves slightly under the horizontal, allowing the bar to slide into the bar carrying channel of the feeder, as presented open in front of the mouth or inlet.

Thus, some tens of bars can be orderly stored, bars that without impacts and opportunely fall down in the bar carrying channels of the feeder.

What we claim is:

1. An automatic feeder for a multi-mandrel lathe having as many channels as said lathe has mandrels, wherein: each of said channels comprise, a fixed channel forming element (3) and a movable channel forming element (4); each of said elements (3), (4) is modular being mechanically and functionally interchangeable with one other; further, each of said elements comprise a covering part formed of harmonic steel (25) stiffened with a continuous desounding dampening bar (27) of an elastomer.

2. An automatic feeder as claimed in claim 1, wherein: said covering part is formed of charged nylon (26).

3. An automatic feeder as claimed in claim 1, wherein: there are provided control members for opening and closing the channels to allow bar introduction, said control members further comprise a connecting rod and crank assembly (21) operated by a shaft (29), supported by an arm (23) being connected to the fixed channel forming element (3), and which reciprocates and arm (28) connected to the movable channel forming element (4) being rotatable on a hinge (30) integral with the fixed portion; said shaft (29) being actuated by a chain 50 through actuating means when the channel is at the correct position aligned with the magazine (1).

4. An automatic feeder as claimed in claim 1, wherein: there is provided a device for feeding or pushing and returning the bar pusher, said device is single for all the channels and is movable by the same means moving the shaft (29).

5. An automatic feeder as claimed in claim 1 or 4, wherein: there is provided a magazine (1) comprising, a fixed guide (37) and two adjustable guides (35) and (36) defining a variable width cavity for a column of bars to be supplied one by one being controlled by a movable rocking sector (39).

* * * * *